INVENTOR.
RICHARD K. GARDNER
BY Ernest J. Weinberger
Max D. Farmer
ATTORNEYS

BEAM AND NULL CHANNEL PATTERNS FOR 10 db COUPLERS

INVENTOR.
RICHARD K. GARDNER
BY Ernest J Weinberger
Max D. Farmer
ATTORNEYS

United States Patent Office 3,277,480
Patented Oct. 4, 1966

3,277,480
SIMULTANEOUS MATRIX LOBING ANTENNA
Richard K. Gardner, Needham, Mass., assignor, by mesne assignments, to the United States of America as represented by the Secretary of the Navy
Filed July 16, 1963, Ser. No. 296,158
1 Claim. (Cl. 343—100)

This invention relates to radar systems and more particularly to lobing antenna systems for both tracking and searching radar.

In devices for accomplishing one of these purposes such as monopulse tracking radar, it is the practice to provide a pair of related antenna arrays each comprising either one horn or a number of other types of radiating elements. The antenna pairs have overlapping directive patterns such as to define an axis of equal signal strength or more commonly, an antenna boresight axis. A radar pulse is simultaneously transmitted by both the antenna arrays and thereafter reflected back toward the antennas by a target in space. A target located on the boresight axis produce equal reflected signals at the antenna units while a target which is off center produces signals differing slightly in amplitude and phase angle depending on the angular deviation of the target from the boresight axis. The received signals are then added and subtracted and their difference amplitude corresponds or depends on the original signal strength and the angular deviation of the target. The sum signal, on the other hand, depends solely on the signal strength of the reflected wave, except where the target angle approaches the antenna bandwidth. Further, the phase relationship of the difference signal to the sum signal depends on the sense of the deviation, the phase of the difference signal in response to a reflection from one side of the boresight axis being reversed with respect to that in response to a similar reflection from the other side of the boresight axis. The later determination generally employs a comparator to provide the necessary relationships while the antenna arrays in most common use are a pair of angularly tilted horn radiators with a common parabolic reflector which must be mechanically rotated. This system has several drawbacks, namely, it is unwieldy, requires bulky complex additional circuitry, and is generally not readily adaptable to perform an additional search function without some interdependence and gain loss in the antenna patterns.

It is therefore an object of this invention to provide a simple, efficient inexpensive and practical radar antenna array capable of simultaneous lobing with independent search and tracking patterns.

Another object is to provide a low frequency linear radar antenna array which will generate two output channels having independent pattern shapes and related only through their peak gain.

Other objects and advantages will appear from the following description of an example of the invention, and the novel features will be particularly pointed out in the appended claims.

In the accompanying drawings.

Figure 1:
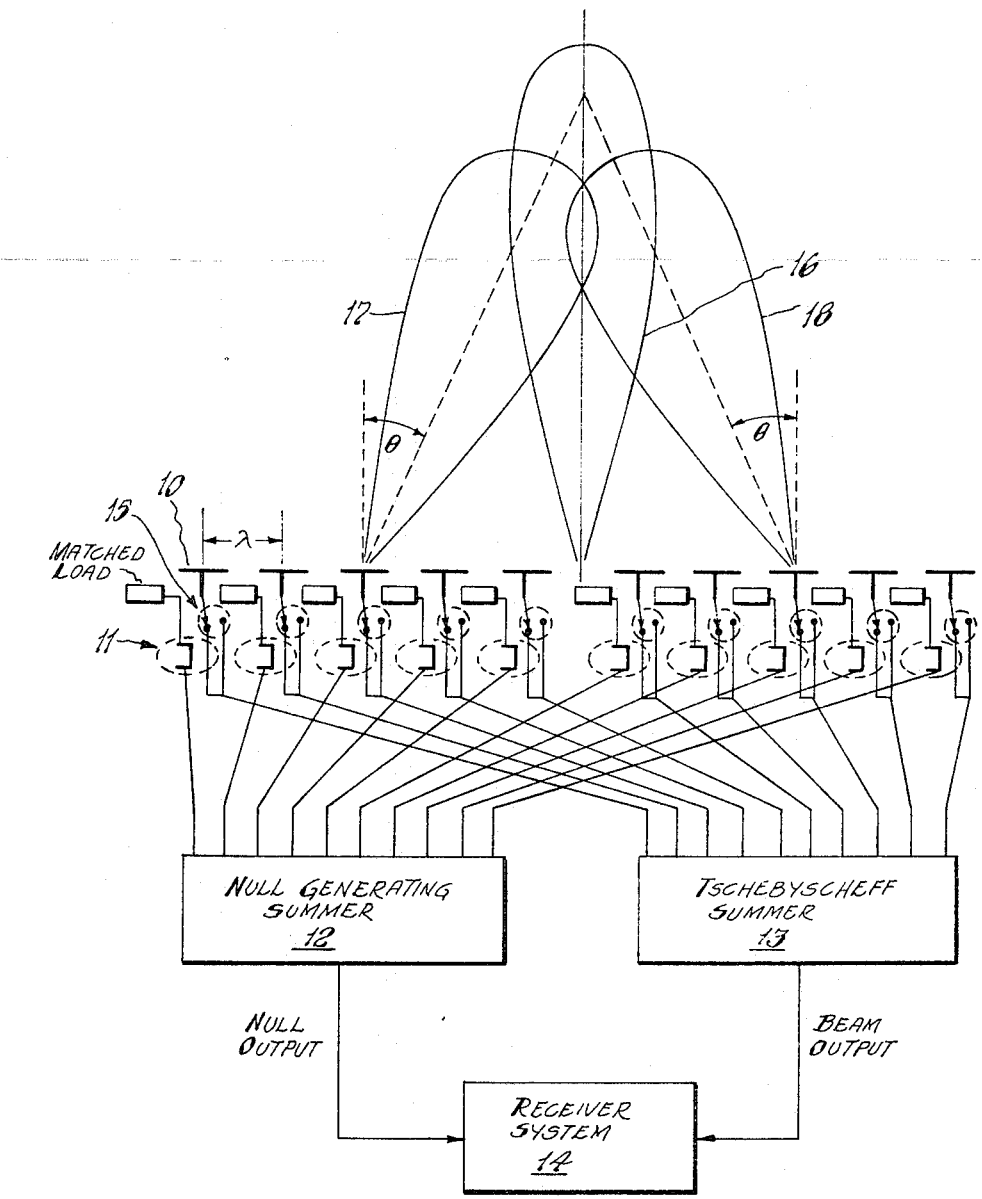
FIG. 1 is a block diagram of an embodiment employing and made in accordance with this invention.

In the embodiment of the invention illustrated in FIG. 1 a linear array of antennas, in this case dipoles 10, are spaced one wavelength apart. Dipole antennas have been shown although other types could be employed since it is in the low microwave frequencies that the most severe problems arise. Furthermore, it should be noted that ten such antennas are illustrated bearing in mind that any number in excess of say, four, would suffice. Each of the dipoles have associated with them an antenna directional coupler 11 of which many presently available varieties would operate satisfactorily. Each of the couplers is connected via cables to a null generating summer network 12 while the dipoles are each connected to a summer 13 which may be of the Tchebycheff type. Both outputs from the summers are fed into a radar receiver system 14. In order to provide the necessary switching coaxial switches 15 are interposed between the summers and the couplers and antenna dipole elements.

The summer 13 is constructed as will be explained hereinafter to produce an output which is essentially a Dolph-Tchebycheff distribution. This distribution results in a minimum side lobe (down approximately 26–30 db) in conjunction with a minimum main beam width as beam 16, while the null summer generates directly a Tchebycheff beam which is shown in two positions 17 and 18 from the opposing 5 dipoles, each tilted at an angle $\theta$ with respect to the array normal but in opposed senses. Thus the null pattern is generated without any intermediate step of generating two sum beams thereby offering greater flexibility and a better null pattern.

Figure 2:
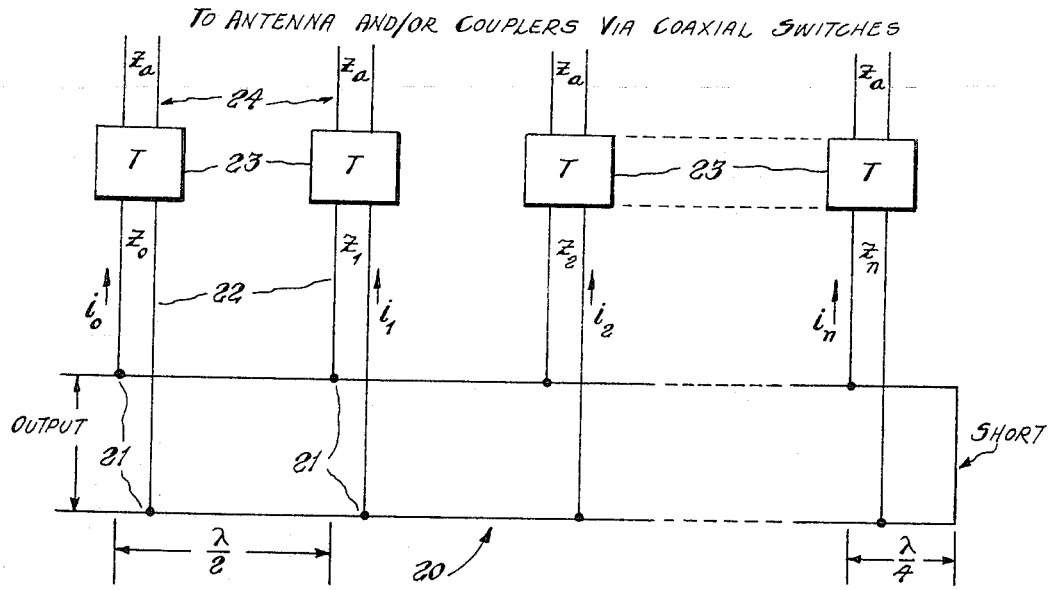
FIG. 2 is a schematic representation of a resonant summer employing the principles of this invention.

The summers 12 and 13 will now be described in some detail with respect to FIG. 2. The circuit comprises a main transmission line 20 having a number of taps 21 along its length each spaced from the adjacent tap by one-half a wavelength with the main line shorted one-quarter of a wavelength past the last tap. Connected across each tap is a tap transmission line 22 each of a different characteristic impedance $Z_0, Z_1 \ldots Z_n$. The other end of each line 22 terminates at an impedance matching means, as transformers 23. Connecting the dipoles or couplers to the transformers 23 are transmission lines 24 which are all of identical impedances $Z_a$.

The basic circuit (shown in FIGURE 2) contains an input coaxial line 21 of one ohm characteristic impedance. Ten output coaxial lines of different characteristics impedance are shunted across the input line with a spacing of ½ wavelength. The input line is terminated by a short circuit spaced ¼ wavelength from the last output line. Finally the output lines 22 are coupled to 10 ohm coaxial lines 24 which impedance was chosen for convenience through an impedance matching transformer.

The basic problem which is to be solved is to determine the required currents on the 10 ohm portion of the output line which are needed in order to produce the desired beam and null pattern. With this knowledge the characteristic impedances $Z_0, Z_1 \ldots Z_n$ are then to be chosen such that a 10 volt input signal on the 1 ohm input line will produce the required current distribution. The peak gain of the array may then be evaluated and compared to the peak gain that a uniform array would produce (for a uniform array $Z = 10$ ohms, in which case I is equal to 1 amp.).

*Beam Channel Summers.*—For the beam channel resonant summers the required current distribution on the 10 ohm section of the output lines required to produce a Tchebycheff distribution with 30 db sidelobes can be easily calculated by standard methods. For a 10 element array one gets $$I_0 = I_9 = 1.25$$
$$I_1 = I_8 = 2.06$$
$$I_2 = I_7 = 3.21$$
$$I_3 = I_6 = 4.25$$
$$I_4 = I_5 = 4.74$$

where $I_0$ to $I_9$ are the currents in lines 22.

Since the impedance transformers are assumed to be lossless, the power required on the input section of the output line can be related to the voltage E on the 1 ohm input line, and the characteristic impedance $z_n$ by $$P_n = \tfrac{1}{2} I_n^2 (10) = \tfrac{1}{2} E_n^2 / Z_n$$

Note that the same voltage E has been used for all values of $n$ since the output lines are spaced ½ wavelength apart. If we arbitrarily pick E to be 10 volts, then the $z_n$ may be calculated to be $$z_0 = z_9 = 6.41$$
$$z_1 = z_8 = 2.36$$
$$z_2 = z_7 = 0.97$$
$$z_3 = z_6 = 0.55$$
$$z_4 = z_5 = .444$$

This set of $z_n$'s will produce the required distribution of output currents but the input line is in general not matched. However, we can match the input line by changing the characteristic impedances of the output line to $gz_n$. The value of the parameter $g$ may be calculated from the equivalent circuitry of FIGURE 2 with the requirement that the 1 ohm input line be properly terminated in which case one finds that $g = 11.4$, hence $$z_0 = z_9 = 73.1 \text{ ohms}$$
$$z_1 = z_8 = 26.6 \text{ ohms}$$
$$z_2 = z_7 = 10.9$$
$$z_3 = z_6 = 6.28$$
$$z_4 = z_5 = 5.06$$

With this set of characteristic impedances, the input line is properly terminated, hence all the input power appears on the output lines. Solving for the output currents produced by a 10 volt input signal one finds that $$I_0 = I_9 = .37$$
$$I_1 = I_8 = .614$$
$$I_2 = I_7 = .956$$
$$I_3 = I_6 = 1.26$$
$$I_4 = I_5 = 1.4$$

To find the peak gain, note that the peak gain is proportional to the sum of the $I_n$, hence the peak gain = 9.2, while the peak gain for a uniform array would be equal to 10, thus the gain of the Tchebycheff array relative to the peak gain of the uniform array is 0.92.

In the actual system shown in FIGURE 1, directional couplers are inserted between the resonant summer and the antenna elements. If the coefficient of coupling of the directional couplers is designated by K, then the resultant output currents on the antenna elements are less than the value given previously for $I_n$ by a factor of $\sqrt{1-k^2}$. Consequently the peak gain of the beam channel, relative to the peak gain possible with just a uniform array is given by $\sqrt{1-k^2} \cdot 0.92$

*Null channel summer.*—The design of linear array is considerably simplified if one introduces the complex variable Z given by $$Z = \exp. j 2\pi L/\lambda \sin \theta$$

where $L$ = Element spacing
$\lambda$ = Wavelength
$\theta$ = Angle measured from array normal in which case the array factor may be written in the form $$AF = \sum_{n=0}^{N-1} I_n Z^n = g \prod_{k=1}^{N-1} (Z - Z_n)$$

Thus the array factor for an array of N elements may be specified by the position of $N-1$ zeros in the complex Z plane. As the above equation indicates the actual values of AF(Z) of interest are those on the unit circle $Z=1$. Moreover we can write $$|AF(Z)| = \prod_{g_n=1}^{N-1} |Z - Z_n|$$

showing that the absolute value of the array factor is simply the product of the length of vectors eminating from the positions of the $N-1$ zeros and terminating on the point Z in question. Note also that the positions of the zeros are independent of the spacings L and wavelength $\lambda$; depending only upon the values of the current $I_n$. However, the spacing and wavelength do determine how much of the unit circle is of interest. Specifically, for $L=\lambda/2$, one travels counterclockwise around the unit circle starting from $-1$ and returning to $-1$ as $\theta$ varies from $-\pi/2$ to $\pi/2$. For $L=\lambda$, one starts at the point $Z=+1$ and travels counterclockwise around the unit circle twice ending back at the $Z=+1$ as $\theta$ varies from $-\pi/2$ to $\pi/2$.

Figure 3:
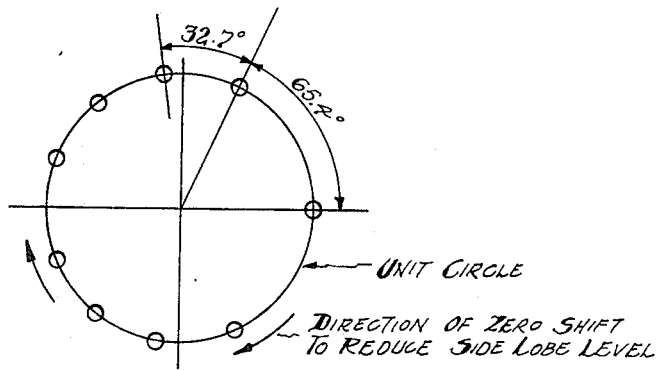
FIG. 3 is a complex plane representation of a unit circle employed in minimizing the sidelobes of a resonant summer.

In the present problem N (antenna elements) = 10 while the spacing $L=\lambda$, hence we want to place the 9 zeros such the $|AF(Z)|$ varies in a desirable manner as one travels around the unit circle which is illustrated in FIG. 3. If the pattern is to have a null at $\theta=0$, a zero must be placed at the point $Z=+1$ (as shown on the right side of the unit circle). The remaining zeros may be placed anywhere in the Z plane, but if the gain is to be kept small everywhere except in the region where $\theta = 0$ it is reasonable to place the zeros on the unit circle with more zeros near the point $Z=-1$ left side of unit circle than near the point $Z=+1$. After a little thought, the distribution shown in FIGURE 3 suggests itself as being a reasonable one. Note that this distribution is not claimed to be an optimum one in any sense but rather just appears to be a reasonable distribution. Referring to Equation 1 it follows that the array factor for such a zero distribution is given by $$AF(Z) = g \frac{\prod_{n=0}^{10} (Z - e^{in\phi_0})}{(Z - e^{i\phi_0})(Z - e^{-i\phi_0})}$$

where $$\phi_0 = 2\pi/11 = 32.7°$$

For the present case, $Z = \exp. j\pi \sin \theta$ hence, the resultant pattern may be calculated as a function of $\theta$ from these equations. Doing this, one finds that the pattern has the shape of the null channel shown in FIG. 4, i.e., the gain peaks at $\pm 4°$ and the first sidelobe is approximately 10.7 percent of the peak gain. For the sample calculation this pattern is deemed to be acceptable. If, however, the first sidelobes are considered to be too high, then they could be reduced by moving the zeros slightly along the unit circle. This shift would result in a slight decrease in peak gain and will move the peaks further apart.

Now that the desired zero distribution is known one has to find the current distribution which will produce this pattern. Referring back to the previous equations, one can write $$\sum_{n=0}^{9} I_k Z^k = \frac{\prod_{n=0}^{11} (Z - e^{ik\phi_0})}{(Z - e^{i\phi_0})(Z - e^{i\phi_0})}$$

Since only the relative values of the currents are of interest at this point the constant $g$ has been set equal to unity. Solving, for the currents one gets $$I_0 = -I_9 = 1.00$$
$$I_1 = -I_8 = 1.69$$
$$I_2 = -I_7 = 1.84$$
$$I_3 = -I_6 = 1.40$$
$$I_4 = -I_5 = 0.52$$

A resonant summer now has to be designed which will produce this current distribution. Note that all currents are either in phase or 180° out of phase, hence the output lines can still be connected to the input one ohm line with a relative spacing of λ/2. The sign variation may be obtained by the way the lines are coupled together or else extra λ/2 line lengths may be inserted wherever needed. With this information the desired characteristic impedances $z_n$ of the output lines may be calculated exactly as was done for the beam channel summer. The results one gets are $$z_0 = z_9 = 18.9$$
$$z_1 = z_8 = 6.62$$
$$z_2 = z_7 = 5.59$$
$$z_3 = z_6 = 9.6$$
$$z_4 = z_5 = 71.4$$

Furthermore, if the input voltage is 10 volts the output currents may be calculated to be $$I_0 = -I_9 = 0.729$$
$$I_1 = -I_8 = 1.23$$
$$I_2 = -I_7 = 1.34$$
$$I_3 = -I_6 = 1.02$$
$$I_4 = -I_5 = .374$$

Calculation now shows that the peak gain of this array relative to the peak gain of a uniform array is 0.9

In an actual system, if necessary, directional couplers may be inserted in the resonant summer of the null channel, and the array elements. These couplers attenuate the current by a factor K, hence the peak gain of the null channel of the actual array is 0.9K.

Figure 4:
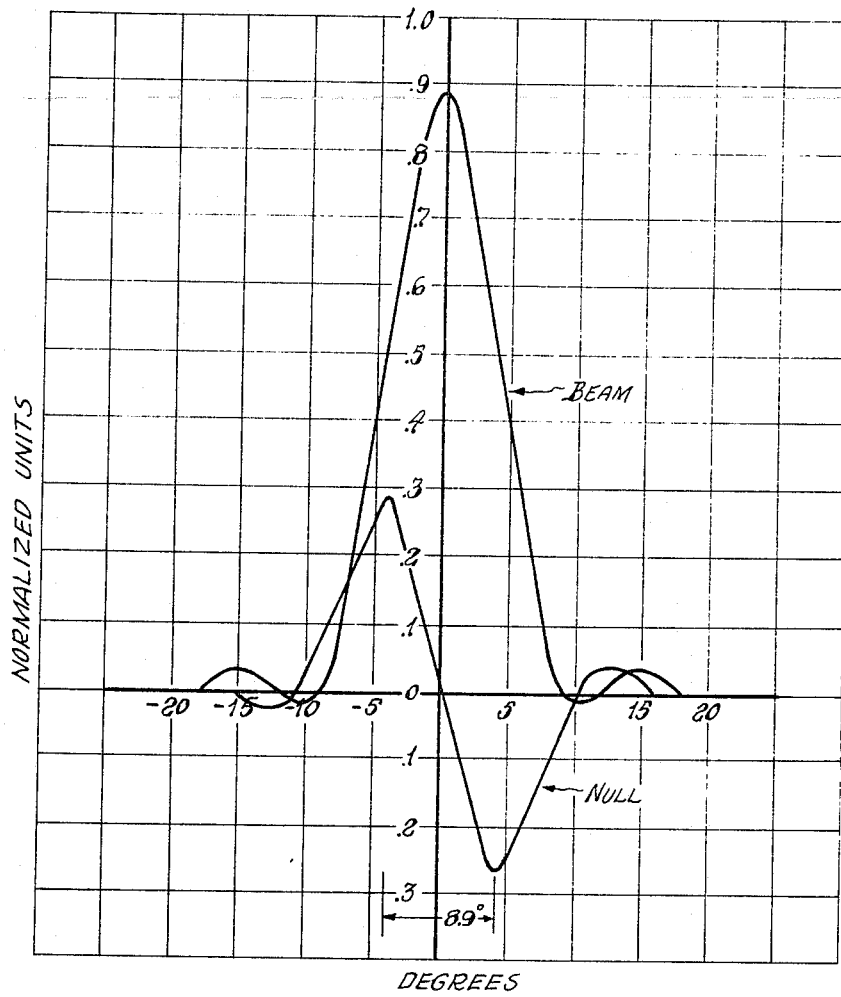
FIG. 4 is a pattern plot of the antenna system showing both null and beam patterns.

The antenna system to be described is capable of providing essentially full search capability with the ability to beamsplit on near targets and jammers. Alternatively, the system could be designed to provide beamsplitting out to essentially full range, with, however, some sacrifice in the maximum search range. The antenna to be analyzed is shown in FIG. 1. The outputs of the individual elements in the array are first applied to a row of directional couplers which have a constant amount of coupling (a typical value of coupling is −10 db). The direct outputs of the directional couplers is sent into a resonant Tchebycheff summer which produces a beam output having a peak gain of 18.9 db and a beamwidth of 6.4° as shown in FIG. 4. On the other hand, the coupled outputs of the directional couplers are sent into a null generating summer to produce a null output which is also shown in FIG. 4.

Thus, as FIG. 4 shows, the antenna system of this invention is capable of producing a search beam with only a 0.3 db loss in gain and no increase in the beamwidth even though beamsplitting can be performed on nearby targets. The null channel which this antenna system generates has a peak gain of 9.1 db with the peaks separated by 8°.

Figure 5:
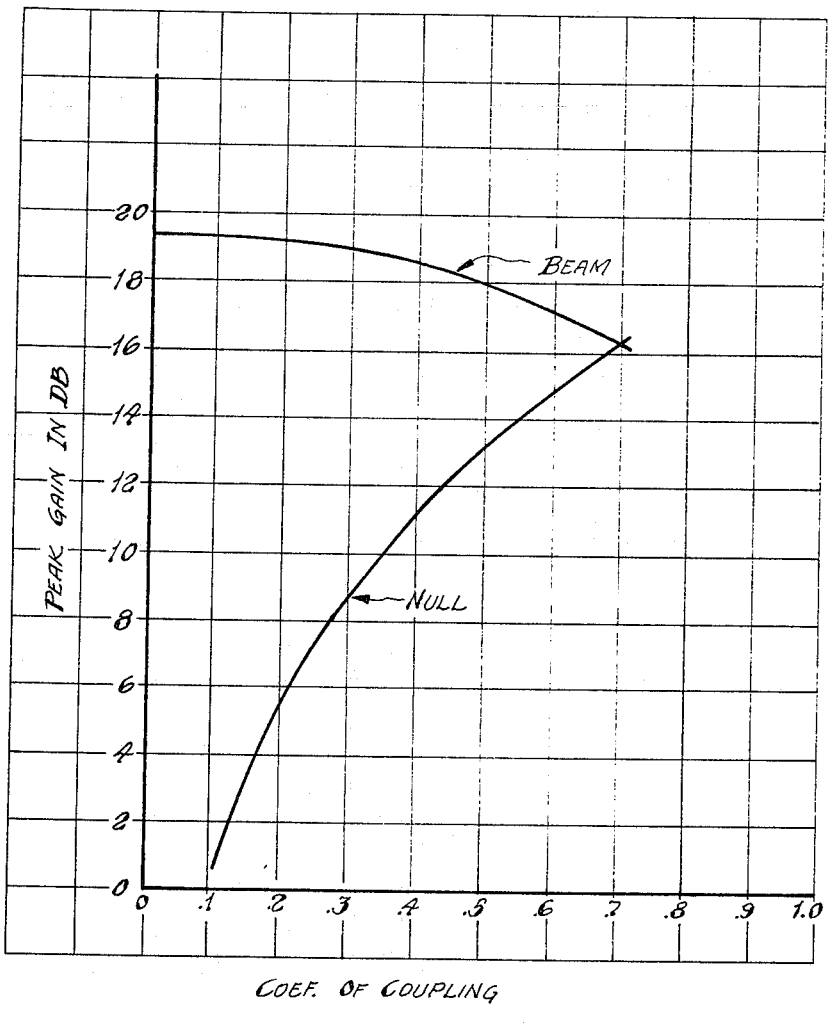
FIG. 5 is a plot of the antenna peak gain vs. coefficient of coupling.

Although the plots of FIG. 4 are based upon 10 db couplers, the resultant patterns for a different coefficient of coupling are exactly the same except for a change in peak gain. Specifically if K is the coefficient of coupling, the peak gain of the beam channel is given by Beam Channel peak gain in $db = 19.28 + 10 \log_{10}(1-k^2)$ while the peak gain of the null channel is given by Null Channel peak gain in $db = 19.08 + 10 \log_{10} k^2$ These relations are plotted in FIG. 5.

Note also that the first sidelobe of the null channel for this antenna is higher than in the null channel in a comparable low frequency monopulse system.

Finally, it should be noted that the instant antenna can be designed to have two modes of operation. The tracking mode, shown in FIG. 1, uses directional couplers between the antenna and the beam output in order to produce the null channel; while the search mode would have only the beam output with the directional couplers removed by using the coaxial switches 15.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

A simultaneous lobing antenna system comprising:
(a) a plurality of linearly disposed dipoles with adjacent dipoles spaced from one another by one wavelength,
(b) a constant directional coupler associated with each of said dipoles,
(c) a length of main transmission line having taps disposed along its length at spaced intervals of one-half a wavelength, said taps being equal in number to said dipoles, said main transmission line short circuited at one end thereof one-quarter wavelength from the last of said taps,
(d) a plurality of identical antenna transmission lines, one connected to each of said couplers,
(e) a plurality of tap transmission lines each one connected to one of said taps,
(f) impedance matching transformers connected to each of said tap lines and one of said antenna lines,
(g) the impedance of said tap lines being selected to provide a current distribution to said dipoles to produce a null pattern,
(h) a second main transmission line, and antenna transmission lines, tap transmission lines and impedance matching transformers, identical to said first-mentioned elements except said antenna lines being connected via said couplers to said dipoles and the impedances of said tap lines being selected to produce a Tchebycheff beam pattern.
(i) whereby when the ends of said main transmission lines opposite said short circuited ends are connected to a radar receiver simultaneous lobing is accomplished.

References Cited by the Examiner

UNITED STATES PATENTS

| | | | |
|---|---|---|---|
| 1,808,869 | 6/1931 | Stone | 343—100.6 |
| 2,236,393 | 3/1941 | Beck et al. | 433—852 |
| 2,848,714 | 8/1958 | Ring | 343—100.6 |
| 3,093,826 | 6/1963 | Fink. | |
| 3,200,401 | 8/1965 | Conger et al. | 343—100.6 |
| 3,202,992 | 8/1965 | Kent et al. | 343—100.6 |

CHESTER L. JUSTUS, *Primary Examiner.*

H. C. WAMSLEY, *Assistant Examiner.*